H. COUSINS.
Combined Horse-Rake, Harrow, and Roller.

No. 134,127. Patented Dec. 24, 1872.

Witnesses

Horace Cousins
by his attorney

UNITED STATES PATENT OFFICE.

HORACE COUSINS, OF WHITING, MAINE.

IMPROVEMENT IN COMBINED HORSE-RAKES, HARROWS, AND ROLLERS.

Specification forming part of Letters Patent No. 134,127, dated December 24, 1872.

*To all whom it may concern:*

Be it known that I, HORACE COUSINS, of Whiting, of the county of Washington and State of Maine, have made a new and useful invention having reference to what are termed Horse-Rakes; and do hereby declare the same to be fully described in the following specification and represented in the accompanying drawing, of which—

Figure 1:
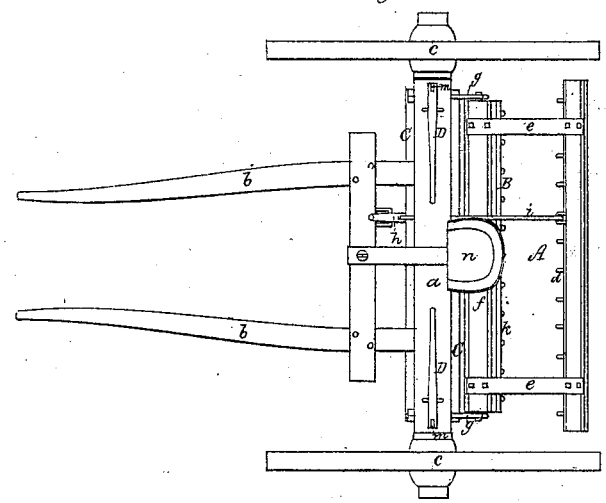
Figure 2:
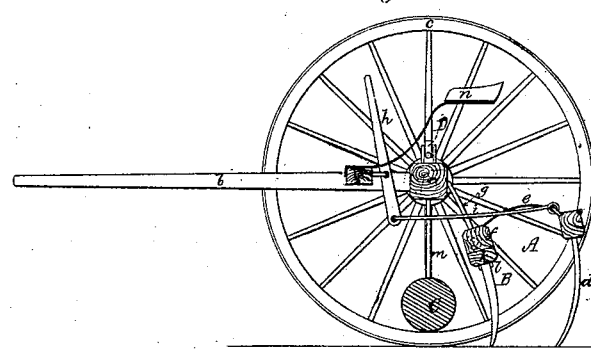
Figure 3:
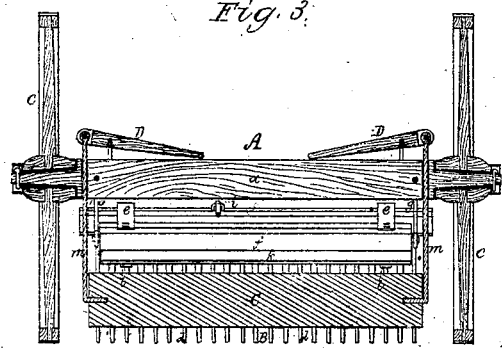

Figure 1 is a top view; Fig. 2, a transverse section; and Fig. 3, a longitudinal section, of a horse-rake embodying my invention.

In such drawing, the horse-rake is represented at A as composed of an axle, $a$, with shafts $b\ b$, wheels $c\ c$, and a toothed rake, $d$, the latter being supported by elastic arms $e\ e$, extended from a rocker-bar, $f$. This rocker-bar has journals at its ends to rest and turn in bearings or arms $g\ g$ projecting from the axle. A lever, $h$, pivoted to the cross-bar of the thills, and connected with the rake-head by a link or rod, $i$, serves to effect the raising of the rake off the ground. In carrying out my invention, I combine with the horse-rake or with the rocker-bar $f$ a removable harrow or series, B, of teeth. Such harrow may be composed of a bar, $k$, and the harrow-teeth projected therefrom, such bar being held to the rocker-bar by clamp-screws and nuts, as seen at $l\ l$, or other proper fastenings admitting of ready removal of the harrow from or its fixation to the rocker-bar, as occasion may require. The harrow or series of harrow-teeth may be otherwise fixed to the rake or its rocker-bar, so as to be removable with respect to such or fixed thereto, the series of harrow-teeth, with the rake-head teeth, answering the purpose of a harrow, as the harrow-teeth are to be arranged so as not to be directly opposite the rake-head teeth, respectively, but between them, so as to work in different paths, and thereby answer, with the rake-teeth, to harrow a piece of land. Underneath the axle is a roller, C, having its journals in hangers or rods $m\ m$, going down through the axle, and from levers D D, arranged and pivoted thereto in manner as shown, all the levers being within reach of an attendant or driver while sitting upon the seat $n$ of the horse-rake.

The roller, when dropped, will rest on the ground, and may be used for rolling it after harrowing or seeding it. When raised, the roller will be no impediment to the operating of the rake or harrow.

From the above it will be seen that I, by a few simple additions, am enabled to use a horse-rake either for raking, harrowing, or rolling a field, thereby saving much expense to a farmer for an extra harrow or roller and shafts or tongues, as usually required.

I claim as my invention as follows, viz:

1. The combination and arrangement of the horse-rake A and the removable harrow or series of harrow-teeth applied to the rocker-bar of the rake-head, all being to operate as specified.

2. The combination of the horse-rake A and the adjustable roller C, applied to the axle of the horse-rake in manner, and to operate substantially, as explained.

3. The combination of the horse-rake A, the removable harrow B, and the adjustable roller C, all constructed and applied together substantially in manner, and to operate as and for the purpose or objects, as set forth.

HORACE COUSINS. [L. S.]

Witnesses:
 WILSON WILCOX,
 ISRAEL P. DINSMORE.